United States Patent
Shiroiwa

(10) Patent No.: US 8,397,247 B2
(45) Date of Patent: Mar. 12, 2013

(54) INFORMATION PROCESSING SYSTEM, INFORMATION PROCESSING METHOD AND COMPUTER-READABLE STORAGE MEDIUM

(75) Inventor: Masataro Shiroiwa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 355 days.

(21) Appl. No.: 12/877,271

(22) Filed: Sep. 8, 2010

(65) Prior Publication Data
US 2011/0093872 A1    Apr. 21, 2011

(30) Foreign Application Priority Data
Oct. 16, 2009    (JP) .................................. 2009-239868

(51) Int. Cl.
*G06F 13/00* (2006.01)

(52) U.S. Cl. ...................................................... 719/330

(58) Field of Classification Search .................. None
See application file for complete search history.

(56) References Cited

U.S. PATENT DOCUMENTS 6,356,863 B1 * 3/2002 Sayle .............................. 703/27
6,988,262 B1 * 1/2006 Mallory et al. ............... 717/127
2002/0144020 A1 * 10/2002 Gooding ........................ 709/330

FOREIGN PATENT DOCUMENTS
JP    3544140    7/2004

* cited by examiner

*Primary Examiner* — S. Sough
*Assistant Examiner* — Phuong Hoang
(74) *Attorney, Agent, or Firm* — Fitzpatrick, Cella, Harper & Scinto

(57) ABSTRACT

A technique to suppress a remote procedure call from a client by a server is provided. An information processing system is provided that includes a client component and a server component, wherein a program of the client component makes an RPC for a function of the server component. The client component includes a holding unit that holds return value information of the function, and a calling unit that receives an RPC request for the function from the program. The server component includes an execution unit that returns a return value of the function to set return value information. When the return value information has not been set in the holding unit, the calling unit makes an RPC for the function. When the return value information has been set in the holding unit, the calling unit returns the return value included in the return value information without making an RPC.

7 Claims, 10 Drawing Sheets

MANAGEMENT UNIT

224

| CLIENT NAME | NODE NAME | REPLY DESTINATION INFORMATION |
|---|---|---|
| COMPONENT A | NODE X | 0x00348213 |
| COMPONENT C | NODE Y | 0x01646287 |
| COMPONENT D | NODE Y | 0x01318873 |

511 — 512 — 513

CLIENT INFORMATION TABLE

225

| CLIENT NAME | FUNCTION NAME | RETURN VALUE TYPE | NUMBER OF USES |
|---|---|---|---|
| COMPONENT C | FUNCTION Ba | PRIOR VALUE | UNRESTRICTED |
| COMPONENT D | FUNCTION Ba | ERROR VALUE | UNRESTRICTED |
| COMPONENT D | FUNCTION Bb | ERROR VALUE | UNRESTRICTED |

521 — 522 — 523 — 524

PRIORITY MODE INFORMATION TABLE

226

| CLIENT NAME | FUNCTION NAME | RETURN VALUE TYPE | NUMBER OF USES |
|---|---|---|---|
| COMPONENT A | FUNCTION Ba | PRIOR VALUE | 2 |
|  |  | ERROR VALUE | UNRESTRICTED |

531 — 532 — 533 — 534

POWER SAVING MODE INFORMATION TABLE

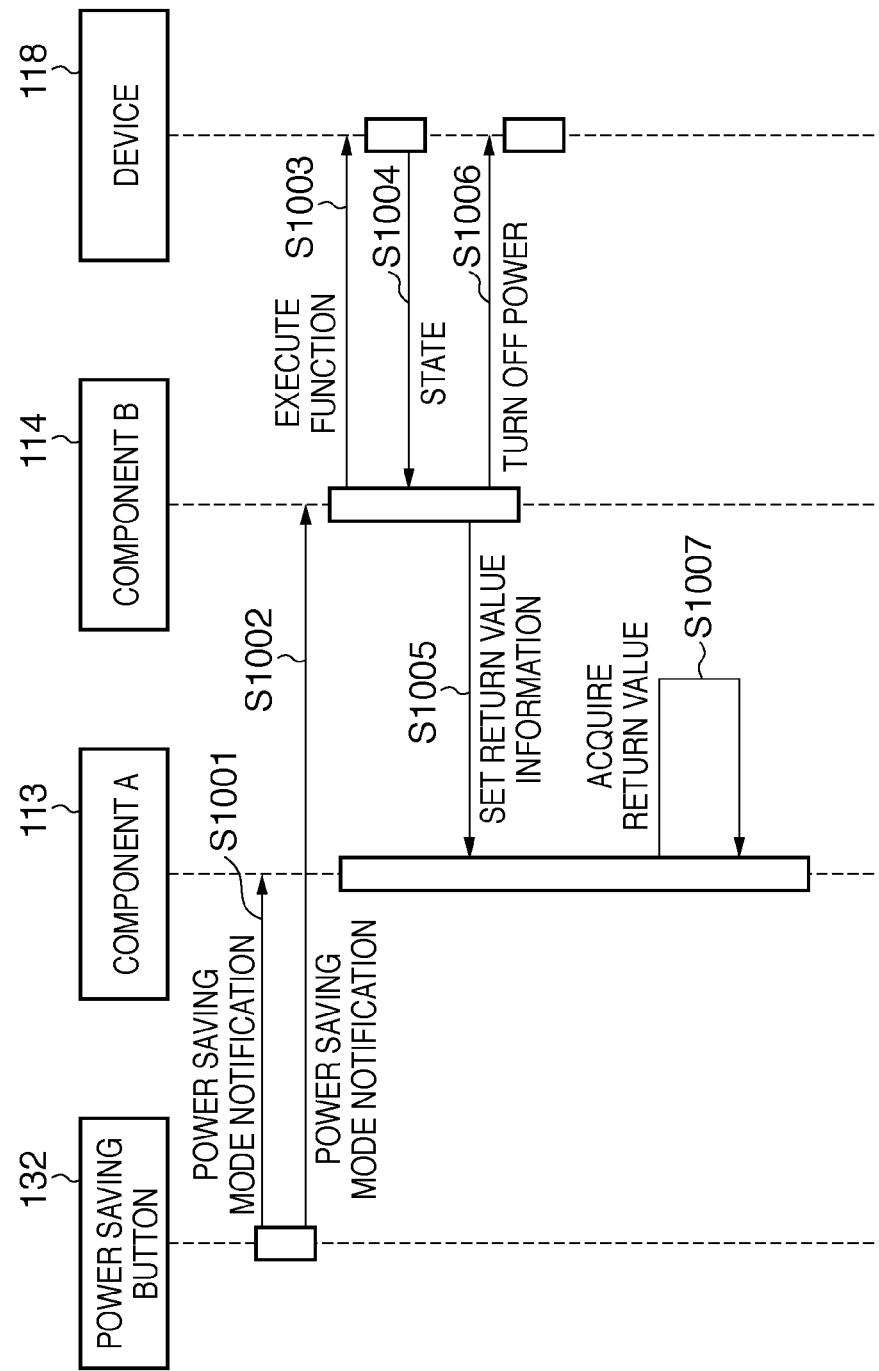

INFORMATION PROCESSING SYSTEM, INFORMATION PROCESSING METHOD AND COMPUTER-READABLE STORAGE MEDIUM

BACKGROUND OF THE INVENTION

1. Field of the Invention

The present invention relates to an information processing system, an information processing method and a computer-readable storage medium storing a computer program.

2. Description of the Related Art

In current system development in which the trend toward a wider variety of products, further complexity of functionality and increased size of software continues, software is divided according to functionality, and development is performed for each domain. Furthermore, attention is given to component-based development that achieves more efficient development and improves quality by reusing software in the form of components that serve as parts of the software. In recent years, it has become common to perform development by using a plurality of processors (CPUs) and operating systems (OSs) within a single device according to product requirements and hardware characteristics. As a result, even within the device, component-based development in such a distributed environment is required. Generally, when using different CPUs/OSs in a distributed environment performs component-based development, the development is performed on component-based development middleware. The component-based development middleware supports a process (data marshalling) for absorbing the difference in data expression format (byte order, alignment) between environments, as well as a service call between components of different CPUs and processes. The component-based development middleware receives input of interface definition information, generates a remote procedure call module, and supports data marshalling during communication. The use of component-based development middleware can achieve component location transparency, and the developers can utilize services in a distributed environment in the same manner as executing a function within the same process by a remote procedure call. With the remote procedure call by the component-based development middleware, component application logic and development environment specific implementation are separated, improving the ease of development and the reusability of components.

The remote procedure call has the following problems unlike an ordinary function call within the same process. First, inside the remote procedure call, "data marshaling" is performed in addition to an "inter-component communication process". Accordingly, it not only requires a longer execution time than that of a function within the same process, but also leads to a degradation in the throughput of the entire system when the call is frequently made. For this reason, it is necessary to suppress unnecessary calls from which valid results cannot be obtained, but timing control for acquiring a valid result requires establishing communication, causing an overhead. Secondly, the remote procedure call executes a service of a server in a distributed environment, and thus it is difficult to monitor whether or not the server is busy by using a low communication overhead similar to that used in the case of the same process. Accordingly, when the server is busy processing other requests or processes of the server itself, the client is blocked for a long period of time, interrupting the processing.

Japanese Patent No. 3544140 proposes, as methods for solving the above problems, a method of checking the availability of resources by using a dedicated remote procedure call and a method of providing a component dedicated to the management of the availability of resources and querying the availability in advance. With this method, on the client side, it is possible to avoid blocking due to waiting for resources to be released. On the server side, however, the remote procedure call is driven by a request from the client, and thus when the client makes excessive calls, the processing throughput of the server application is decreased, as a result of which the following problems arise. First, even when there is no change in the content of replies from the server component, because there is no configuration that notifies the client of processing, the server may process excessive requests. Secondly, even when the server component needs to execute a high priority process, it also has to respond to a request from the client, and thus the high priority process is interrupted. Thirdly, even when it is necessary to put the server component in a standby state in a power saving mode of the device or the like, it is not possible to immediately interrupt the service.

SUMMARY OF THE INVENTION

The present invention provides a technique for suppressing a remote procedure call from a client by a server.

According to a first aspect of the present invention, there is provided an information processing system comprising a first component and a second component, a program of the first component making a remote procedure call for a function included in the second component, wherein the first component comprises: a holding unit that holds return value information of the function; and a calling unit that receives a remote procedure call request for the function from the program, the second component comprises: an execution unit that, when a return value of the function is requested from the calling unit, returns a return value obtained as a result of execution of the function to the calling unit; and a setting unit that, when suppressing a remote procedure call from the program, sets return value information including the return value of the function, and causes the holding unit to hold the return value information, and the calling unit makes a remote procedure call for the function and returns the returned return value to the program when the return value information has not been set in the holding unit, and returns the return value included in the return value information to the program without making a remote procedure call for the function when the return value information has been set in the holding unit.

Further features of the present invention will become apparent from the following description of exemplary embodiment with reference to the attached drawings.

BRIEF DESCRIPTION OF THE DRAWINGS

FIG. 5 is an exemplary client information table 224 according to the embodiment of the present invention.

FIG. 10 is a sequence diagram of an exemplary operation of the entire information processing apparatus 100 when it is switched to a power saving mode according to the embodiment of the present invention.

DESCRIPTION OF THE EMBODIMENTS

An embodiment of the present invention will be described below with reference to the attached drawings. Hereinafter, "remote procedure call" is referred to simply as "RPC".

Configuration of Information Processing Apparatus 100

Figure 1:
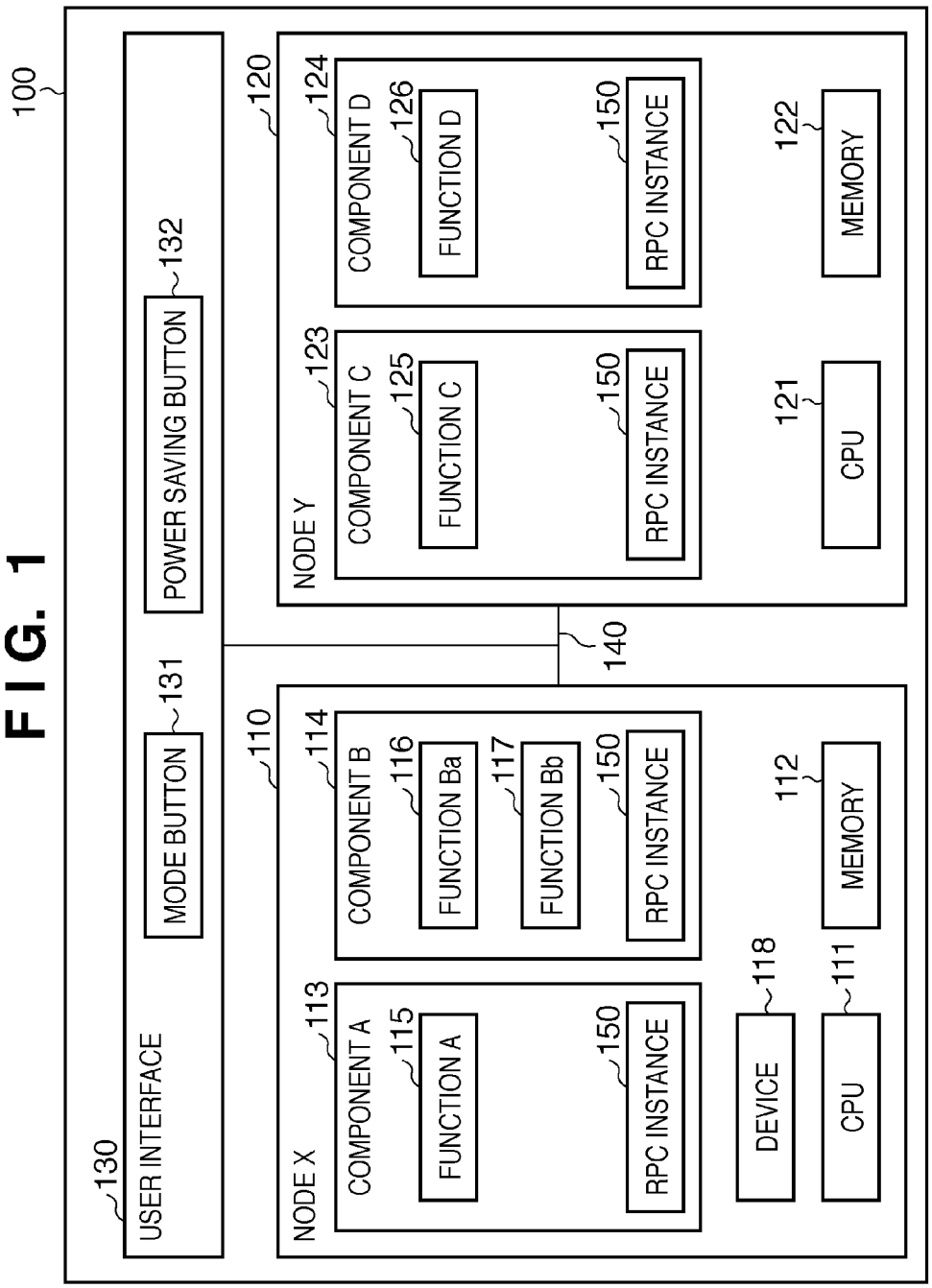
FIG. 1 is a configuration block diagram of an exemplary information processing apparatus 100 according to an embodiment of the present invention.

A configuration of an information processing apparatus 100 according to the present embodiment will be described with reference to FIG. 1. In the present embodiment, as an example of an information processing system according to the present invention, the information processing apparatus 100 that includes a node X 110, a node Y 120 and a user interface 130 is used. The node X 110, the node Y 120 and the user interface 130 are connected to each other via an internal network 140, and the information processing apparatus 100 is operated by cooperative operation of these elements.

The node X 110 includes a CPU 111, a memory 112, a component A 113, a component B 114 and a device 118. The CPU 111 controls the operations of the entire node X 110. The memory 112 stores a computer program, data and the like that are used in the node X 110, and is implemented by a ROM, RAM or the like. The component A 113 is a part of a program used in the node X 110, and includes a function A 115 and an RPC instance 150. The RPC instance 150 is a program used when the component A 113 executes an RPC, which will be described later in detail. Similarly, the component B 114 is also a part of a program used in the node X 110, and includes a function Ba 116, a function Bb 117 and an RPC instance 150. In this embodiment, the function Ba 116 and the function Bb 117 are assumed to be functions for acquiring the state of the device 118. For example, in the case where the device 118 is a transport arm, the function Ba 116 acquires the position of the distal end of the transport arm, and the function Bb 117 acquires the height of the distal end of the transport arm. The node Y 120 includes a CPU 121, a memory 122, a component C 123 including a function C 125, and a component D 124 including a function D 126. The elements included in the node Y 120 are the same as those included in the node X 110, and thus descriptions thereof are omitted here.

The user interface 130 includes a mode button 131 and a power saving button 132. The mode button 131 is a button for switching the state of the information processing apparatus 100 between a normal mode and a priority mode. When the priority mode is set, the node X 110 preferentially operates the component A 113 over the component B 114. The power saving button 132 is a button for switching the state of the information processing apparatus 100 between the normal mode and a power saving mode. When the power saving mode is set, the node X 110 turns off the power of the device 118.

Figure 2:
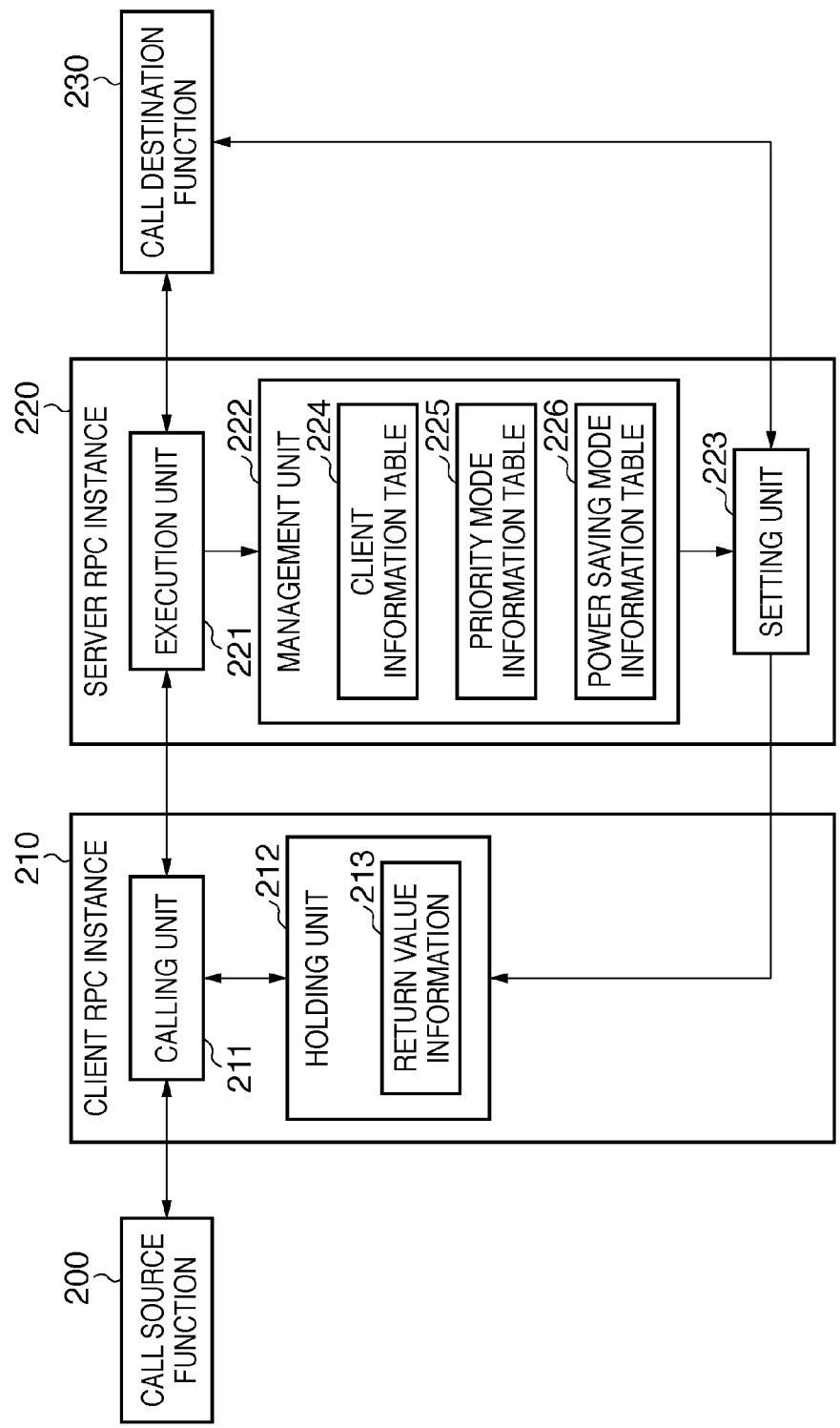
FIG. 2 is a detailed block diagram of an exemplary RPC instance 150 according to the embodiment of the present invention.

Subsequently, the RPC instance 150 will be described in detail with reference to FIG. 2. The RPC instance 150 provides an RPC function to the component. The RPC instance 150 includes at least one of a client RPC instance 210 and a server RPC instance 220. The client RPC instance 210 includes a calling unit 211 and a holding unit 212. The calling unit 211 receives an RPC request for a call destination function 230 from a call source function 200. The calling unit 211 serializes the call destination function name, node name, reply destination information and argument data acquired from the call source function 200 in a communication format, and transmits the data to an execution unit 221 to make a request for a return value of the call destination function 230. Then, the calling unit 211 deserializes the data received from the execution unit 221 to acquire a return value of the call destination function 230, and returns the return value to the call source function 200. The holding unit 212 holds return value information 213. The return value information 213 will be described later in detail.

The server RPC instance 220 includes the execution unit 221, a management unit 222 and a setting unit 223. Upon receiving an RPC request from the calling unit 211, the execution unit 221 executes a call destination function 230 corresponding to the function name acquired by deserializing the received data, and obtains a return value. Then, the execution unit 221 serializes the obtained return value in a communication format, and transmits the return value to the calling unit 211 based on the received reply destination information. The management unit 222 manages a client information table 224, a priority mode information table 225 and a power saving mode information table 226. These tables will be described later in detail. The setting unit 223 sets or deletes the return value information 213 held in the holding unit 212 when the mode of the information processing apparatus 100 is switched.

Figure 3:
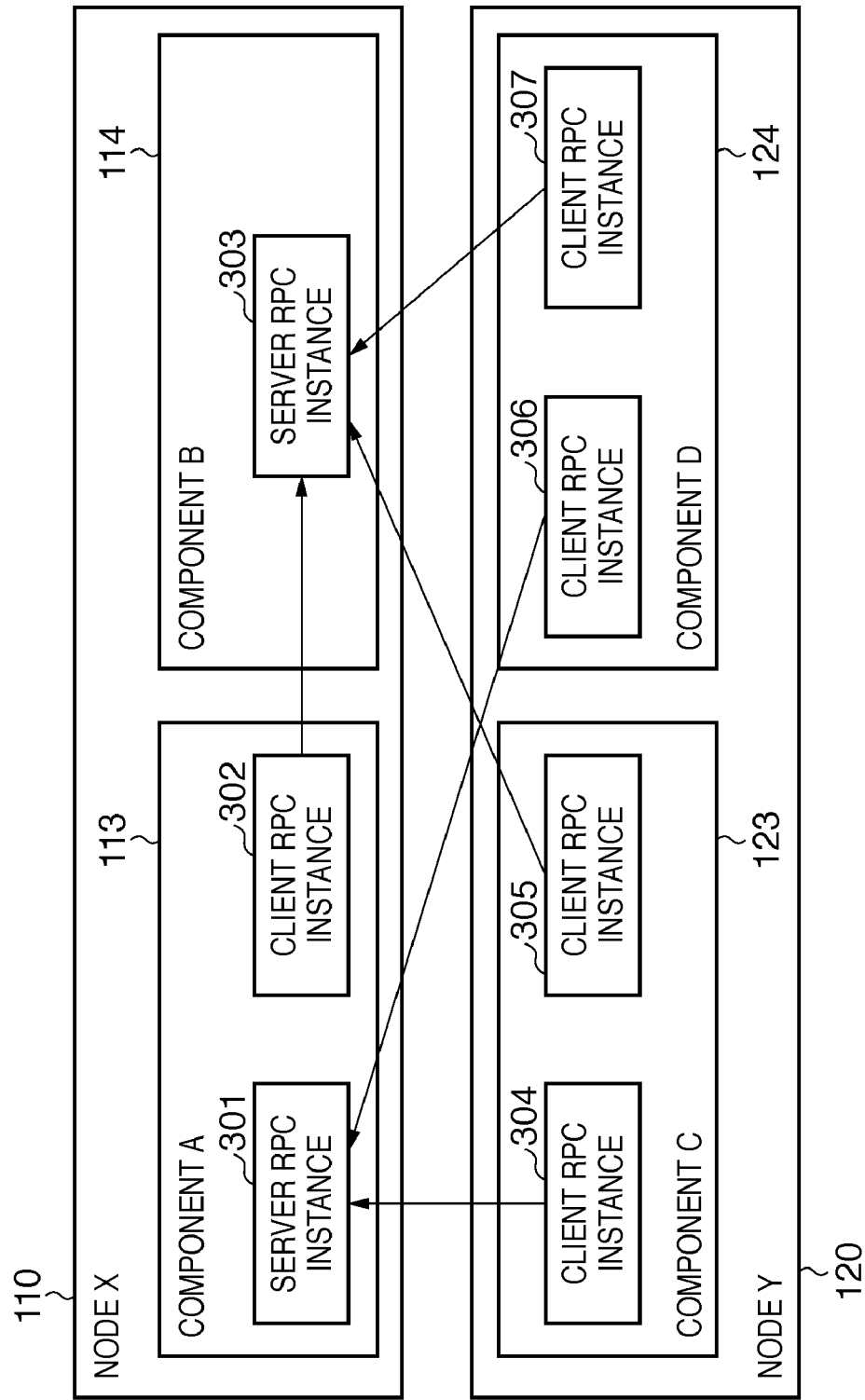
FIG. 3 is a correlation diagram of exemplary RPC instances 150 according to the embodiment of the present invention.

Subsequently, the RPC instances 150 included in the components will be described with reference to FIG. 3. In the present embodiment, the components that include a call destination function 230 are assumed to include one server RPC instance 220. Hereinafter, the components that include a call destination function 230 will be referred to as "server components" (second components). Likewise, the components that include a call source function 200 are assumed to include client RPC instances 210 that correspond to the server components. Hereinafter, the components including a call source function 200 will be referred to as "client components". Specifically, the component A 113 uses a function included in the component B 114 via a client RPC instance 302. The component C 123 uses a function included in the component A 113 via a client RPC instance 304, and uses a function included in the component B 114 via a client RPC instance 305. The component D 124 uses a function included in the component A 113 via a client RPC instance 306, and uses a function included in the component B 114 via a client RPC instance 307. On the other hand, the component A 113 receives an RPC from the component C 123 and the component D 124 via a server RPC instance 301. The component B 114 receives an RPC from the component A 113, the component C 123 and the component D 124 via a server RPC instance 303.

The following are interface definitions for the component A 113 and the component B 114. In the interface description language (IDL), "in" is a reserved word that indicates that a relevant parameter is transmitted to a component, and "out" is a reserved word that indicates that a relevant parameter is acquired from a component.

```
Component CompoA {
    long FuncA(in long arg1);    //function A 115
};
Component CompoB {
    void FuncBa(out long * arg1);  //function Ba 116
    long FuncBb(in long arg1);   //function Bb 117
};
```

The following are remote procedure interfaces provided by the calling unit 211 based on the interface definitions.
Calling unit 211 interface for the component A 113:
long FuncA(in long arg1);
Calling unit 211 interface for the component B 114:

```
            void FuncBa(out long * arg1);
            long FuncBb(in long arg1);
```

The following are return value information deregistration interfaces provided by the setting unit 223 based on the interface definitions.
Setting unit 223 interface for the component A 113:

```
    int setValue__CompoA__FuncA(
        clientIDList__t clientID, useTimes__t time, long
    returnValue);
        int unsetValue__CompoA__FuncA(clientIDList__t clientID);
```

Setting unit 223 interface for the component B 114:

```
        int setValue__CompoB__FuncBa(
            clientIDList__t clientID, useTimes__t time, long
    arg1);
            int unsetValue__CompoB__FuncBa(clientIDList__t
    clientID);
            int setValue__CompoB__FuncBb(
                clientIDList__t clientID, useTimes__t time, long
    returnValue);
            int unsetValue__CompoB__FuncBb(clientIDList__t
    clientID);
```

RPC Response Process on Server Side

Figure 4:
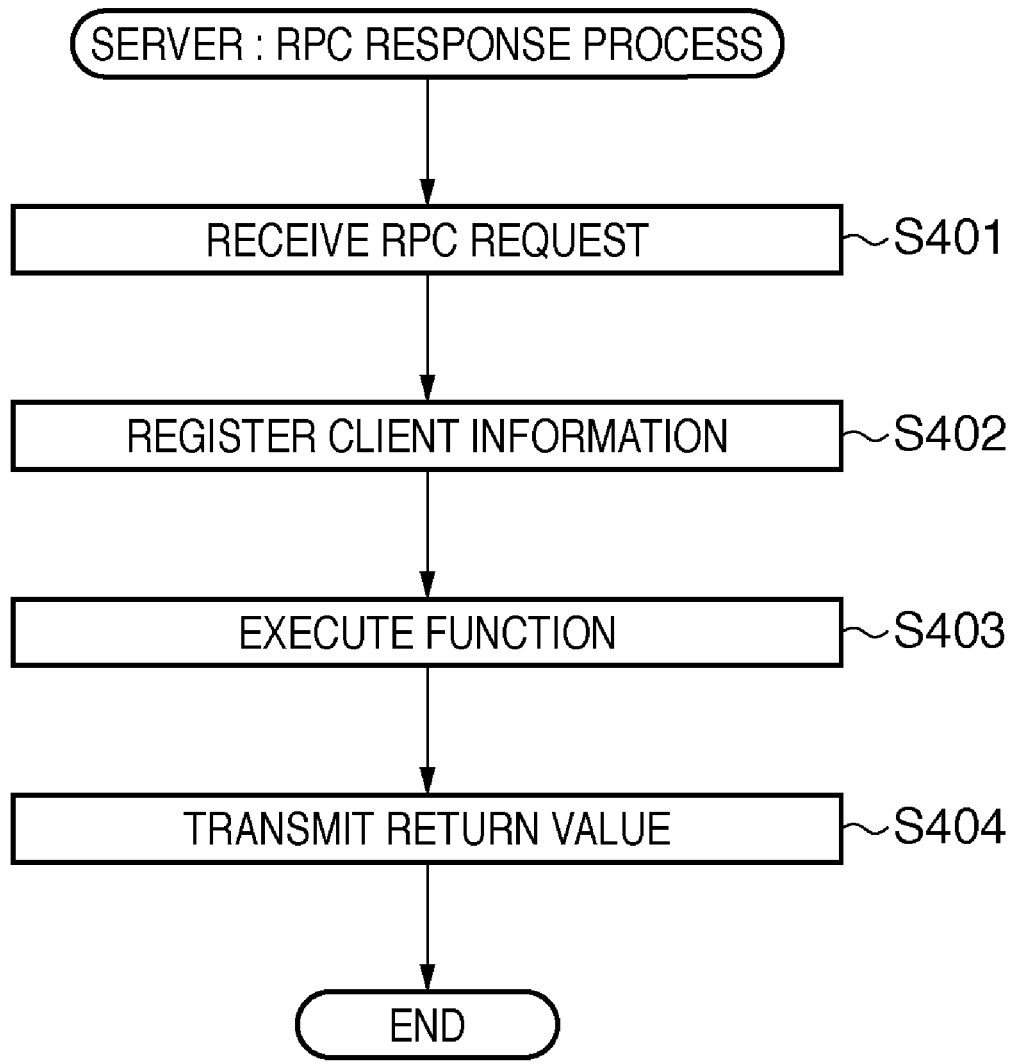
FIG. 4 is a flowchart of an exemplary operation of a server RPC instance 220 according to the embodiment of the present invention.

An operation of the server RPC instance 220 when an RPC request is received will be described with reference to the flowchart of FIG. 4. Here, an example will be described in which the function C 125 of the component C 123 uses the function Ba 116 of the component B 114 by an RPC. The CPU 111 that processes a computer program stored in the memory 112, which is a computer-readable storage medium, executes the operation of this flowchart.

In S401, the execution unit 221 of the server RPC instance 303 included in the component B 114 receives an RPC request from the calling unit 211 of the client RPC instance 305 included in the component C 123. In S402, the execution unit 221 associates the name of the client component (first component) that has made the RPC request, the name of the node including the client component, and reply destination information of the client component with each other, and registers them in a client information table 224 included in the management unit 222. In S403, the execution unit 221 executes the function Ba 116 included in the RPC request, and acquires a return value. In S404, the execution unit 221 transmits the acquired return value to the calling unit 211.

The client information table 224 of the server RPC instance 303 included in the component B 114 will be described with reference to FIG. 5. The management unit 222 stores client name 511, node name 512 and reply destination information 513 in association with each other as the client information table 224. The client name 511 is the name of a client component that has transmitted an RPC request to the component B 114. The node name 512 is the name of a node that includes the client component. The reply destination information 513 is the address of the client RPC instance 210 of the client component. The management unit 222 may manage the table by using IDs to which a client name 511 and a node name 512 are assigned. In the present embodiment, the client components that have transmitted an RPC request are registered in the client information table 224, but each registration may be performed manually.

RPC Process on Client Side in Normal Mode

Figure 6:
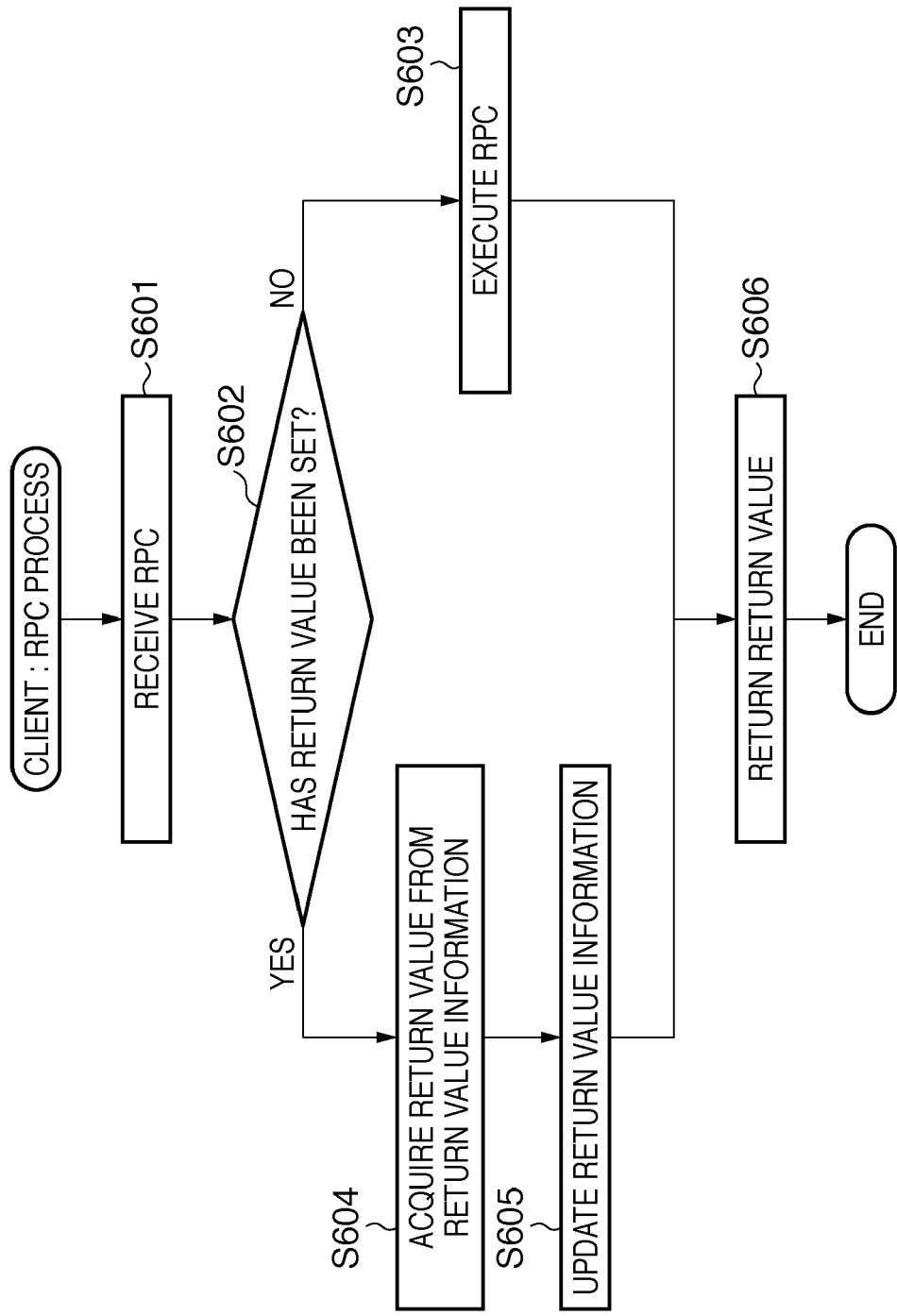
FIG. 6 is a flowchart of an exemplary operation of a client RPC instance 210 when an RPC request is received in a normal mode according to the embodiment of the present invention.

An operation of the client RPC instance 210 when an RPC request is received in a normal mode will be described with reference to the flowchart of FIG. 6. Here, an example will be described in which the function C 125 of the component C 123 uses the function Ba 116 of the component B 114 by an RPC. The operation of this flowchart is executed by the CPU 121 processing a computer program stored in the memory 122 that is a computer-readable storage medium.

In S601, the calling unit 211 of the client RPC instance 305 included in the component C 123 receives an RPC request for the function Ba 116 from the function C 125. In S602, the calling unit 211 determines whether or not the return value of the function Ba 116 has been set in the return value information 213. In the case of the normal mode, the return value of the function Ba 116 is not set in the return value information 213 ("NO" in S602), and thus the process advances to S603. In S603, the calling unit 211 transmits the RPC request to the execution unit 221. The RPC request was described in detail above, and thus a description thereof is not repeated here. In S606, the calling unit 211 returns the acquired return value of the function Ba 116 to the function C 125.

RPC Process in Priority Mode

An operation when the information processing apparatus 100 is set to a priority mode will be described. In the present embodiment, when the information processing apparatus 100 is switched from the normal mode to the priority mode by the mode button 131 being pressed, the node X 110 preferentially operates the component A 113. Accordingly, the node X 110 tries to not operate the component B 114 as much as possible. As described in connection to FIG. 3, the component B 114 provides services to the component A 113, the component C 123 and the component D 124. At this time, if the component B 114 rejects all RPC requests, a request from the component A 113 is rejected, and the process of the component A 113 is not prioritized. Alternatively, if the component B 114 simply ignores all requests except for a request from the component A 113, the queue overflows, which may cause a state mismatch. Accordingly, in order to preferentially operate the component A 113, the component B 114 suppresses RPC requests from the components other than the component A 113. To this end, in the present embodiment, the component B 114 sets return value information 213 in the components other than the component A. The components in which return value information 213 has been set return the return value acquired from the return value information 213 to the call source function 200 without making an RPC request to the component B 114.

An operation of the server RPC instance 303 when the information processing apparatus 100 is set to the priority mode will be described first with reference to FIG. 7. The operation of this flowchart is executed by the CPU 111 processing a computer program stored in the memory 112 that is a computer-readable storage medium. In S701, the setting unit 223 of the server RPC instance 303 included in the component B 114 determines to which mode the information processing apparatus 100 is changed. If priority mode is determined ("Priority Mode" in S701), the process advances to S702. In S702, the setting unit 223 acquires priority mode information from a priority mode information table 225 of the management unit 222.

The priority mode information table 225 will be described with reference to FIG. 5. The priority mode information table 225 held in the management unit 222 includes priority mode information regarding clients in which return value information is set when the mode is switched to the priority mode. The priority mode information is information in which client name 521, function name 522, return value type 523 and number of uses 524 are associated. The client name 521 is the name of a client component of the component B. The function name 522 is the name of a call destination function 230 for which the client component makes an RPC request. The return value type 523 is the type of return value that is set in the client when the information processing apparatus 100 is set to the priority mode. When the return value type 523 is "prior value", the setting unit 223 sets a return value obtained as a result of execution of the call destination function 230 when setting return value information. When the return value type 523 is "error value", the setting unit 223 sets a return value that caused an error when the call destination function 230 was executed. The number of uses 524 is the number of times the calling unit 211 can use the return value set in the holding unit 212 in the client component. The number of uses 524 is set unrestrictedly while the information processing apparatus 100 is set to the priority mode such that the calling unit 211 can always refer to the return value included in the return value information. In this manner, the priority mode information table 225 holds the information of the client components in which return value information is to be set when the information processing apparatus 100 is set to the priority mode. The priority mode information table 225 is set in advance.

However, when the return value information is set by the setting unit 223 of the component B 114, the following settings are made.

```
/* Register the return value of the function Ba in the
components C and D */
setValue_CompoB_FuncBa([component C, component D],
unrestricted, 0x45192340);
/* Register the return value of the function Bb in the
components C and D */
setValue_CompoB_FuncBb([component C, component D],
unrestricted, 0x45192360);
```

Figure 7:
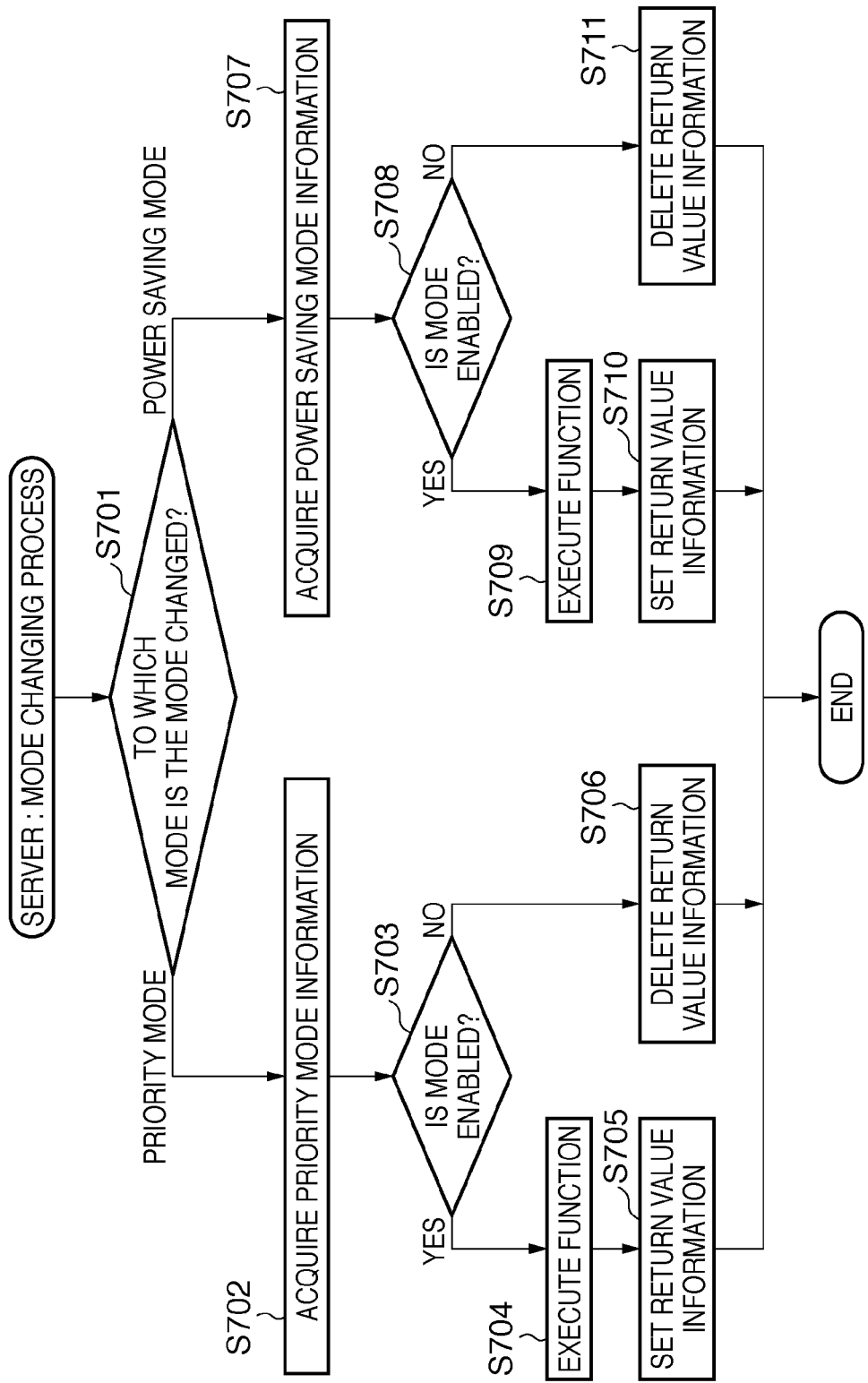
FIG. 7 is a flowchart of an exemplary operation of a server RPC instance 303 when a priority mode is set according to the embodiment of the present invention.

Reverting to FIG. 7, in S704, the execution unit 221 executes the function designated by the function name 522 in accordance with the return value type 523, and acquires a return value. In S705, the setting unit 223 sets the acquired return value in the return value information 213 of the client RPC instance 210. As reply destination information of the client RPC instance 210, reply destination information registered in the client information table 224 can be used. As for the clients having the same node name 512, the return value information may be collectively transmitted to that node.

Figure 8:
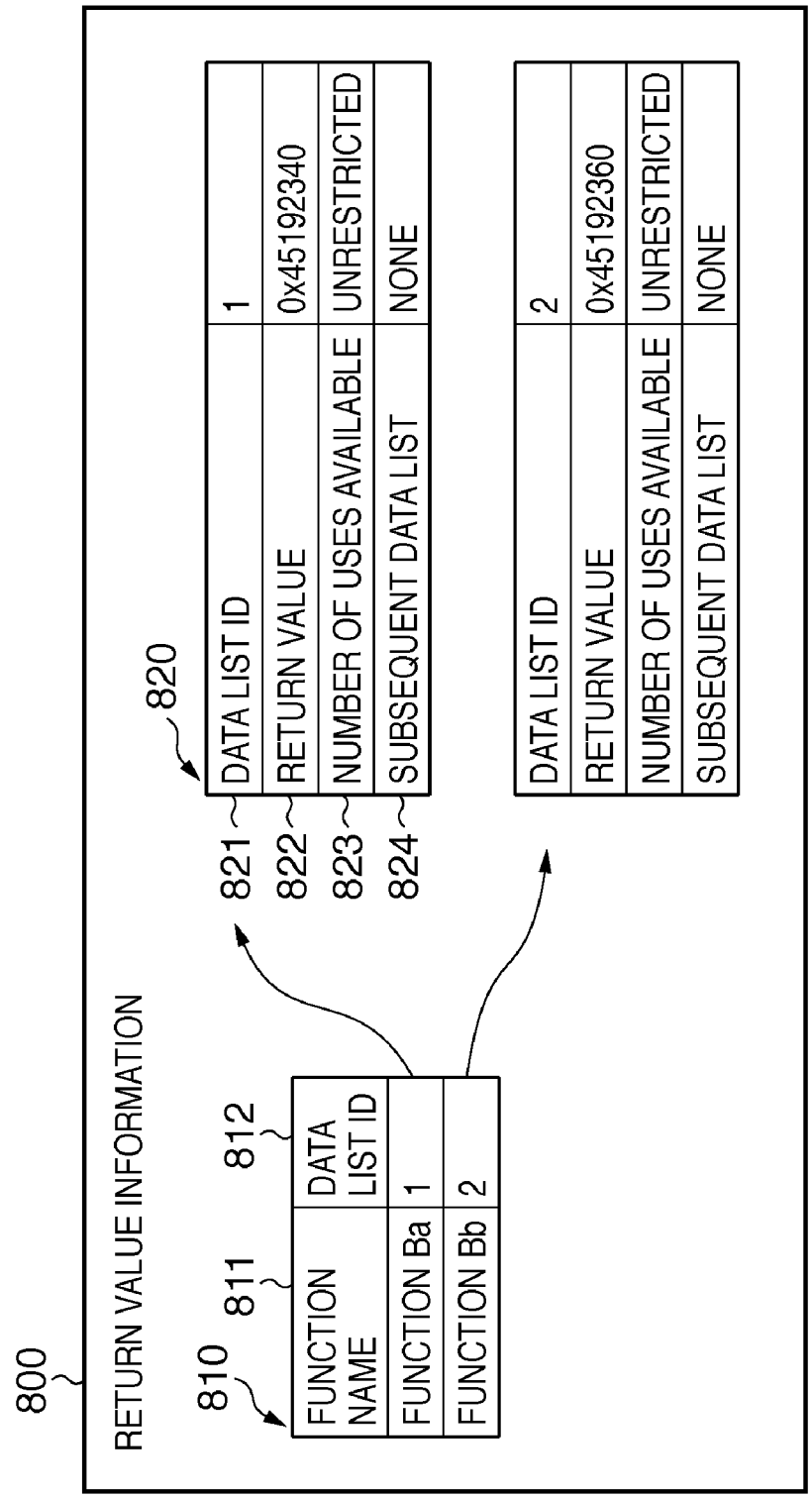
FIG. 8 shows an exemplary return value information 800 according to the embodiment of the present invention.

Return value information 800 of the client RPC instance 305 included in the component C 123 when the information processing apparatus 100 is set to the priority mode will be described with reference to FIG. 8. As described in connection to FIG. 3, the client RPC instance 305 is an RPC instance 150 that is used when the component C 123 makes an RPC to the component B 114. The return value information 800 includes a function list 810 and a data list 820. The function list 810 is a list of functions of the component B 114 used with use of the RPC by the component C 123. Function name 811 is the name of a function used by the RPC. Data list ID 812 is the ID of the data list 820 to which each function refers. The data list 820 includes a return value for each function. Data list ID 821 is the ID of the data list 820, and corresponds to the data list ID 812. Return value 822 is a return value that is returned to the call source function 200 by the calling unit 211 when an RPC for a function of the component B 114 is requested in the priority mode. Number of uses available 823 is the remaining number of times the calling unit 211 can use the return value 822. Subsequent data list 824 is a link to another data list 820. When the information processing apparatus 100 is in the priority mode, the data indicated by the return value information 800 is set in the holding unit 212 of the client RPC instance 305 included in the component C 123.

Subsequently, an operation of the client RPC instance 210 when an RPC request is received in the priority mode will be described by again referring to the flowchart of FIG. 6. It is assumed that in S601, the calling unit 211 receives, for example, an RPC request for the function Ba 116 from the function C 125. In S602, the calling unit 211 determines whether or not the return value information 213 has been set in the holding unit 212. As indicated by the return value information 800 of FIG. 8, the return value information 213 of the function Ba 116 is set ("YES" in S602), and thus the process advances to S604. In S604, the calling unit 211 acquires the return value of the function Ba 116 from the return value information 213. In S605, the calling unit 211 updates the return value information 213. In the case of the priority mode, the update is unnecessary. In S606, the calling unit 211 returns the return value of the function Ba 116 to the function C 125. In this manner, the return value of the function Ba 116 can be returned to the function C 125 without actually making an RPC from the component C 123 to the component B 114. Accordingly, it is possible for the component B 114 to process only an RPC request from the component A 113.

Subsequently, an operation of the information processing apparatus 100 when the priority mode is changed to the normal mode by the mode button 131 being pressed again will be described with reference to the flowchart of FIG. 7. In S701, the setting unit 223 determines that the priority mode is switched, and in S702, the setting unit 223 acquires priority mode information from the priority mode information table 225. In S703, the setting unit 223 determines that the priority mode is disabled ("NO" in S703), and in S706, the setting unit 223 deletes the return value information 213 held in the holding unit 212 in accordance with the acquired priority mode information. For example, the setting unit 223 deletes the return value information 800 shown in FIG. 8. Consequently, the calling unit 211 again performs an RPC process in the normal mode.

When the return value information is set by the setting unit 223 of the component B 114, the mode is disabled as follows.

```
/* Register the return value of the function Ba in the
components C and D */
unsetValue_CompoB_FuncBa([component C, component D]);
/* Register the return value of the function Bb in the
```

```
components C and D */
unsetValue_CompoB_FuncBb([component C, component D]);
```

RPC Process in Power Saving Mode

An operation performed when the information processing apparatus 100 is set to a power saving mode will be described. In the present embodiment, when the information processing apparatus 100 is switched from the normal mode to the power saving mode by the power saving button 132 being pressed, the power of the device 118 is turned off. It is assumed that when switching to the power saving mode, the function A 115 of the component A 113 needs to call the function Ba 116 of the component B 114 twice in order to acquire the state of the device 118. At this time, if the function A 115 takes time to call the function Ba 116, the node X 110 cannot turn off the power of the device 118 until the calling of the function Ba 116 ends. To address this, the component B 114 acquires in advance the return value of the function Ba 116, and registers the return value in the component A 113, whereby the node X 110 can promptly turn off the power of the device 118. Because the return value of the function Ba 116 is set in the component A 113, the function A 115 can continue processing even after the power of the device 118 is turned off.

An operation of the server RPC instance 220 when the information processing apparatus 100 is set to the power saving mode will be described first with reference to the flowchart of FIG. 7. In S701, power saving mode is determined ("Power Saving Mode" in S701), and the process advances to S707. In S707, the setting unit 223 acquires power saving mode information from a power saving mode information table 226 of the management unit 222. The power saving mode information table 226 will be described with reference to FIG. 5. The power saving mode information table 226 held in the management unit 222 includes power saving mode information regarding clients in which return value information is set when the mode is switched to the power saving mode. The power saving mode information includes client name 531, function name 532, return value type 533 and number of uses 534. These are the same as those of the priority mode information, and thus descriptions thereof are omitted here. The number of uses 534 is set to "2" so that while the information processing apparatus 100 is set to the power saving mode, "prior value" is returned only a required number of times to switch to the power saving mode, and thereafter the number of uses 534 is unrestrictedly set so that "error value" is returned. In this manner, the power saving mode information table 226 holds the information of the client component in which return value information is to be set when the information processing apparatus 100 is set to the power saving mode. The power saving mode information table 226 is set in advance.

When the return value information is set by the setting unit 223 of the component B 114, the mode is disabled as follows.

```
* Register the return value of the function Ba in the
component A */
setValue_CompoB_FuncBa([component B], 2, 0x45192440 );
/* Register the return value of the function Bb in the
components C and D */
setValue_CompoB_FuncBa([component B], unrestricted,
0x45192640 );
```

Reverting to FIG. 7, steps S709 and S710 are performed, but these operations are the same as those of steps S704 and S705, and thus descriptions thereof are omitted here.

Figure 9:
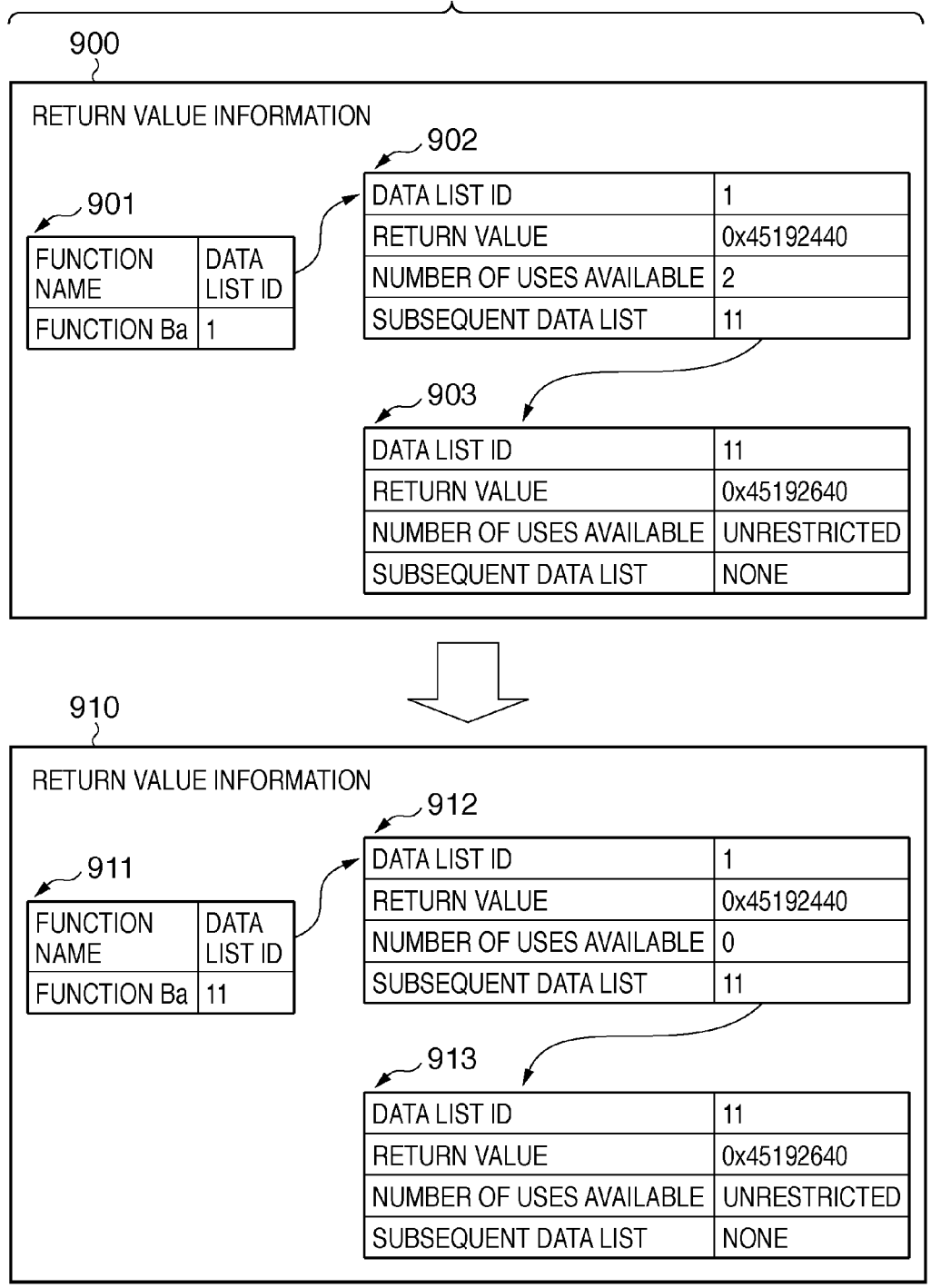
FIG. 9 shows another exemplary return value information 900 according to the embodiment of the present invention.

Return value information 900 of the client RPC instance 302 included in the component A 113 when the information processing apparatus 100 is set to the power saving mode will be described with reference to FIG. 9. In a function list 901, a data list ID "1" is set for the function Ba. In a data list 902, "2" is set in the number of uses available. In other words, in the data list 902, the upper limit of the number of uses of the return value is two. In the data list 902, a subsequent data list is designated.

Subsequently, an operation of the client RPC instance 210 when an RPC request is received in the power saving mode will be described by again referring to the flowchart of FIG. 6. The processes other than S605 are the same as those in the priority mode, and thus descriptions thereof are not repeated here. In S605, the calling unit 211 updates the return value information 213. The update of the return value information 213 will be described with reference to FIG. 9. When the return value held in the data list 902 is used, the calling unit 211 reduces the number of uses available by one. Then, when the number of uses available reaches 0, the calling unit 211 switches the data list ID of the function list 901 to that indicated in the subsequent data list of the data list 902. As a result, the holding unit 212 holds return value information 910. Accordingly, in this case, when the calling unit 211 receives an RPC request for the function Ba from the function A 115, the return value of a data list 913 is returned. Here, the data list 912 is illustrated for convenience of description, but the data list 912 may be deleted in order to save the memory capacity.

An operation of the information processing apparatus 100 when the power saving mode is changed to the normal mode by the power saving button 132 being pressed again is the same as that when the priority mode is changed to the normal mode, and thus a description thereof is not repeated here.

An operation of the entire information processing apparatus 100 when it is switched to the power saving mode will be described with reference to the sequence diagram of FIG. 10. When the power saving button 132 is pressed, in S1001, a notification indicating that the mode is switched to the power saving mode is sent to the component A 113. In S1002, a notification indicating that the mode is switched to the power saving mode is sent to the component B 114. In S1003, the component B 114 executes the function Ba 116, and acquires the state of the device 118 in S1004. In S1005, the component B 114 sets return value information in the component A 113. After that, in S1006, the component B 114 turns off the power of the device 118. In S1007, the component A 113 makes an RPC request for the function Ba 116 from the function A 115, but because the return value information is set, the component A 113 acquires the state of the device 118 without making a request to the component B 114.

With the configuration described above, according to the present invention, it is possible to suppress the RPC request from a client component by the server component. In addition, the client component can obtain the return value of a call destination function without actually making an RPC request, and thus can continue processing. As a result, a communication load between the client component and the server component can be reduced. Furthermore, by executing in advance a function that will be required when the mode is changed to the power saving mode, the mode can be promptly switched to the power saving mode. Also, the server component can set the upper limit of the number of uses of return value information, and thus it is possible to prevent the client component from continuously using an inappropriate return value.

In the above embodiment, the present invention is carried out between the node X 110 and the node Y 120 as an example, but when there are a plurality of components within a node, the same effects can be obtained by applying the present invention by using an RPC.

Also, in the above embodiment, the tables are provided in the management unit 222, but the tables are not necessarily provided, and the setting unit 223 may execute a part of a function called by an RPC, and return a return value to the client. For example, a function is set in the setting unit 223 from the call destination function 230 of FIG. 2, and the setting unit 223 sets a return value in the holding unit 212. The function may be set in advance in the setting unit 223. In such a configuration, the management unit 222 may be omitted.

Other Embodiments

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-239868, filed on Oct. 16, 2009, which is hereby incorporated by reference herein in its entirety.

What is claimed is:

1. An information processing system comprising:
a first component; and
a second component, a program of the first component making a remote procedure call for a function included in the second component, wherein
the first component includes:
a holding unit that holds return value information of the function; and
a calling unit that receives a remote procedure call request for the function from the program,
the second component includes:
an execution unit that, when a return value of the function is requested from the calling unit, returns a return value obtained as a result of execution of the function to the calling unit; and
a setting unit that, when suppressing a remote procedure call from the program, sets return value information including the return value of the function, and causes the holding unit to hold the return value information,
the calling unit makes a remote procedure call for the function and returns the returned return value to the program when the return value information has not been set in the holding unit, and returns the return value included in the return value information to the program without making a remote procedure call for the function when the return value information has been set in the holding unit,
the setting unit sets an upper limit of a number of uses of the return value of the function in the return value information in association with the return value, and
when the number of uses of the return value included in the return value information reaches the upper limit, the calling unit deletes the return value.

2. The information processing system according to claim 1, wherein
the second component further comprises a management unit that manages the first component that makes a remote procedure call for the function, and
the setting unit sets the return value information in the first component that is managed by the management unit.

3. The information processing system according to claim 1, wherein the setting unit deletes the return value information held in the holding unit when releasing the suppression of the remote procedure call.

4. The information processing system according to claim 1, wherein when suppressing a remote procedure call from the program, the setting unit incorporates a return value obtained as a result of execution of the function performed at the timing of suppression in the return value information.

5. The information processing system according to claim 1, wherein when suppressing a remote procedure call from the program, the setting unit incorporates a return value that is to be returned when an error occurred in execution of the function in the return value information.

6. An information processing method for an information processing system, the information processing system including a first component and a second component, a program of the first component making a remote procedure call for a function included in the second component, the first component including a holding unit that holds return value information of the function, the method comprising steps of:
when suppressing a remote procedure call from the program, setting return value information including a return value of the function, and causing the holding unit to hold the return value information, which is performed by the second component;
receiving a remote procedure call request for the function from the program, which is performed by the first component;
when a return value of the function is requested in the receiving, returning a return value obtained as a result of execution of the function to the first component, which is performed by the second component;
making a remote procedure call for the function and returning the returned return value to the program when the return value information has not been set in the holding unit;
returning the return value included in the return value information to the program without making a remote procedure call for the function when the return value information has been set in the holding unit;
setting an upper limit of a number of uses of the return value of the function in the return value information in association with the return value; and
when the number of uses of the return value included in the return value information reaches the upper limit, deleting the return value,
wherein at least one of said steps is performed using a computer.

7. A non-transitory computer-readable storage medium storing a computer program that when executed by a processor causes a computer to perform a method for an information processing system, the information processing system including a first component and a second component, a program of the first component making a remote procedure call for a function included in the second component, the first component including a holding unit that holds return value information of the function, the method comprising steps of:

when suppressing a remote procedure call from the program, setting return value information including a return value of the function, and causing the holding unit to hold the return value information, which is performed by the second component;

receiving a remote procedure call request for the function from the program, which is performed by the first component;

when a return value of the function is requested in the receiving, returning a return value obtained as a result of execution of the function to the first component, which is performed by the second component;

making a remote procedure call for the function and returning the returned return value to the program when the return value information has not been set in the holding unit;

returning the return value included in the return value information to the program without making a remote procedure call for the function when the return value information has been set in the holding unit;

setting an upper limit of a number of uses of the return value of the function in the return value information in association with the return value; and when the number of uses of the return value included in the return value information reaches the upper limit, deleting the return value.

* * * * *